(No Model.)
F. W. GRAVES.
LEMON SLICER AND SQUEEZER.
No. 574,413. Patented Jan. 5, 1897.
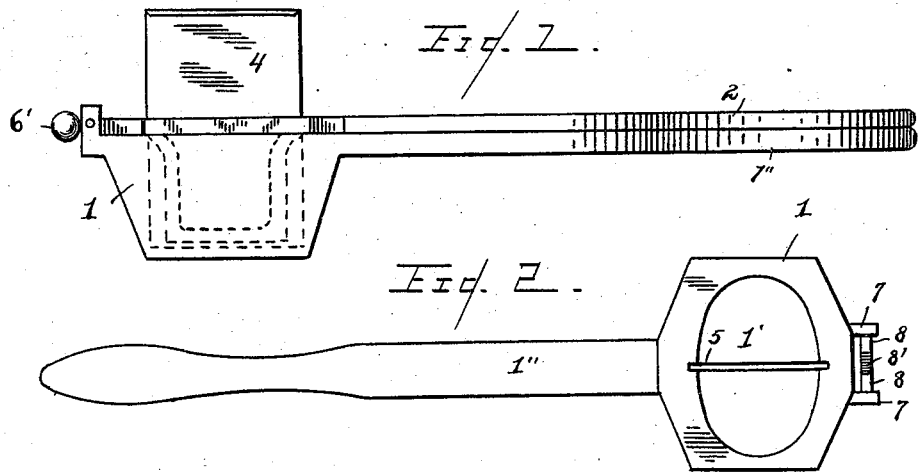
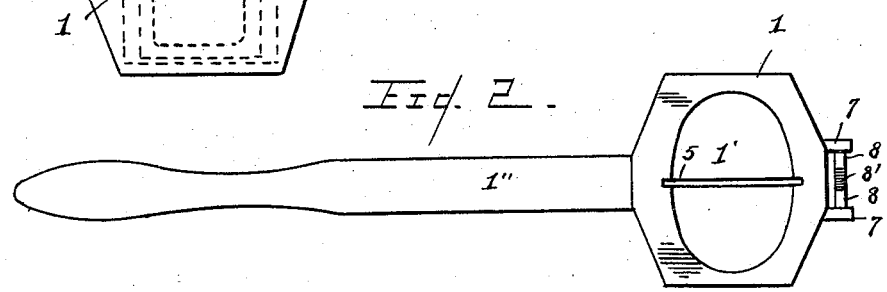
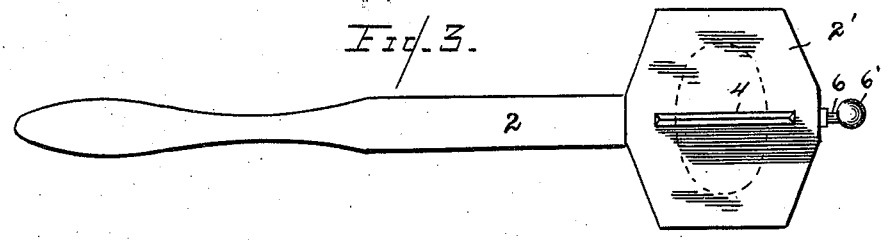
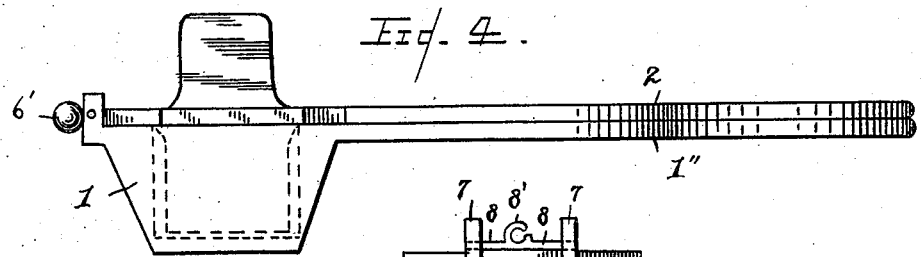
WITNESSES
INVENTOR
Frank W. Graves,
By H. Roscoe Wheeler
Attorney.

UNITED STATES PATENT OFFICE.

FRANK W. GRAVES, OF BEHLER, WEST VIRGINIA.

LEMON SLICER AND SQUEEZER.

SPECIFICATION forming part of Letters Patent No. 574,413, dated January 5, 1897.

Application filed July 8, 1896. Serial No. 598,409. (No model.)

*To all whom it may concern:*

Be it known that I, FRANK W. GRAVES, a citizen of the United States, residing at Behler, in the county of Monongalia and State of West Virginia, have invented certain new and useful Improvements in Lemon Slicers and Squeezers; and I do hereby declare the following to be a full, clear, and exact description of the invention, such as will enable others skilled in the art to which it appertains to make and use the same, reference being had to the accompanying drawings, forming a part of this specification.

This invention relates to a lemon slicer and squeezer; and it consists in the construction and arrangement of parts, as hereinafter fully set forth, and pointed out particularly in the claim.

The object of the invention is to provide a device of the character set forth with a blade on one side of the compressing-lever, by means of which a lemon may be sliced, and a plunger on the opposite side of said lever, by means of which the juice may be pressed or squeezed from the portion of a lemon therebeneath, which object is attained by the device illustrated in the accompanying drawings, in which—

Figure 1 is a side elevation of my improved lemon-squeezer. Fig. 2 is a plan view of the lower portion of the squeezer, showing a bowl in which the lemon is placed while being sliced and squeezed. Fig. 3 is a plan view of the blade side of the compressing-lever. Fig. 4 is a side elevation of the squeezer as seen in Fig. 1 with the plunger turned up and the blade seated in the bowl; and Fig. 5 is an end elevation of Fig. 2, showing a swivel connection on the edge of the bowl for the end of the operating-lever.

Referring to the figures of reference, 1 designates a bowl provided with a cavity or receiver 1' therein of such size as to readily receive a lemon laid therein upon one of its sides.

2 represents a handle similar in outline and size to the handle 1'' of the bowl 1, provided with an enlarged end or block 2'.

On one side of the enlarged end 2' of the handle 2 is formed a plunger 3, said plunger being of such size as to fit within the cavity of the bowl 1 and allow enough space between the sides and bottom of the bowl and plunger to receive the skin and pulp of a portion of a lemon after the juice has been extracted therefrom, only a small space being necessary for this purpose. Projecting from the opposite side of the enlarged end 2' of the handle 2 is a knife or blade 4.

It will be seen by reference to Figs. 1 and 4 that the knife-blade is wider and deeper than the lemon-receiving cavity, but it will be seen by reference to Fig. 2 that a recess is formed in the sides and bottom of said cavity, in which the knife-blade may be seated.

Extending from the outer end of the lever 2 is a neck 6, having an enlarged head 6'. Formed integral with the outer edge of the bowl 1 are ears 7.

8 represents trunnions which are pivoted in said ears, and 8' represents a ring having a portion of its side removed, forming an aperture, said aperture being of sufficient size to readily receive the neck 6. The association and operation of parts herein shown and described are as follows:

In assembling the parts of the squeezer the handle 1'' is placed opposite the handle 2 and the neck 6 entered through the open side of the ring 8', when, if desired, the upper portion of said ring may be bent down so as to close the aperture in said ring and securely hold said neck therein, as will be well understood.

Supposing the blade 4 to be on the lower side of the handle 2, as shown in Fig. 5, by raising the outer or free end of said lever the blade will be withdrawn from the bowl, when a lemon or other object may be placed within the bowl, and by bearing down upon said lever said blade may be caused to reënter the bowl and to sever said lemon, and a clean cut is effected by reason of the blade entering the groove or recess 5 in the sides and bottom of the bowl, which produces a shearing cut, as will be well understood. After a lemon has thus been severed the lever 2 is then raised and one of the portions of the lemon removed from the bowl and the other turned with the flat or severed face downward upon the bottom of the bowl. When a portion of the lemon has been thus placed, the handle 3 is revolved, so as to bring the plunger 3 on the under side thereof, when by bearing down or moving the handle 1″ in the direction of the handle 2 it will be seen that as the plunger is forced into the bowl the juice in the portion of the lemon being pressed will be squeezed therefrom, when it will be allowed to flow over the edges of the bowl and down into a suitable receptacle, (not shown,) or, if desired, suitable apertures may be formed through the bottom of bowl 1, through which the juice may ooze.

It will now be seen that the parts herein shown and described produce a very simple and durable lemon-squeezer, as well as one that may be cheaply made and which will serve as a lemon-slicer as well as a lemon-squeezer, the many advantages of which are at once apparent.

Having thus fully set forth my invention, what I claim as new, and desire to secure by Letters Patent, is—

In a lemon slicer and squeezer, the combination of the bowl, the handle extending therefrom, the ears formed upon the edge of the bowl, the trunnions pivoted therein, the block substantially of the same contour as said bowl, the neck projecting from said block, the enlargement on said neck, the handle extending from the opposite edge of said block, the plunger projecting from one face of said block, the blade projecting from the other and the recess formed in the inner edges and bottom of the bowl for the reception of portions of said blade, substantially as and for the purpose set forth.

In testimony whereof I affix my signature in presence of two witnesses.

FRANK W. GRAVES.

Witnesses:
C. W. GRAVES,
T. WILSON.